United States Patent
Wu et al.

(10) Patent No.: US 10,122,538 B2
(45) Date of Patent: Nov. 6, 2018

(54) ANTIFUSE PHYSICALLY UNCLONABLE FUNCTION UNIT AND ASSOCIATED CONTROL METHOD

(71) Applicant: eMemory Technology Inc., Hsin-Chu (TW)

(72) Inventors: Meng-Yi Wu, Hsinchu County (TW); Hsin-Ming Chen, Hsinchu (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/726,470

(22) Filed: Oct. 6, 2017

(65) Prior Publication Data

US 2018/0102909 A1 Apr. 12, 2018

Related U.S. Application Data

(60) Provisional application No. 62/406,968, filed on Oct. 12, 2016.

(51) Int. Cl.
*G11C 17/16* (2006.01)
*H04L 9/32* (2006.01)
*G11C 17/18* (2006.01)

(52) U.S. Cl.
CPC ............ *H04L 9/3278* (2013.01); *G11C 17/16* (2013.01); *G11C 17/18* (2013.01)

(58) Field of Classification Search
CPC ..................................................... G11C 17/16
USPC ....................................................... 365/225.7
See application file for complete search history.

(56) References Cited

U.S. PATENT DOCUMENTS

| | | | |
|---|---|---|---|
| 8,848,905 B1* | 9/2014 | Hamlet | H04K 1/04 380/35 |
| 9,613,714 B1* | 4/2017 | Wong | G11C 17/16 |
| 2007/0133334 A1* | 6/2007 | Peng | G11C 17/16 365/225.7 |
| 2010/0250936 A1* | 9/2010 | Kusakawa | H04L 9/3278 713/169 |
| 2014/0042442 A1 | 2/2014 | Bruley et al. | |
| 2015/0127537 A1* | 5/2015 | Kim | G06K 19/07345 705/44 |
| 2017/0200508 A1* | 7/2017 | Grigoriev | G11C 17/16 |

(Continued)

OTHER PUBLICATIONS

European Patent Office, "European search report", dated Mar. 9, 2018.

(Continued)

*Primary Examiner* — Min Huang
(74) *Attorney, Agent, or Firm* — WPAT, PC (57) ABSTRACT

An antifuse physically unclonable function (PUF) unit includes a first sub-antifuse cell, a second sub-antifuse cell, a connection circuit, a first copying circuit and a first reading circuit. The first sub-antifuse cell includes a first antifuse transistor. The second sub-antifuse cell includes a second antifuse transistor. The connection circuit is connected between a source/drain terminal of the first antifuse transistor and a source/drain terminal of the second antifuse transistor. The first copying circuit is connected with the first sub-antifuse cell, and includes a third antifuse transistor. The first reading circuit is connected with the first copying circuit. Moreover, the first reading circuit generates a random code according to a state of the third antifuse transistor.

14 Claims, 9 Drawing Sheets

(56) References Cited

U.S. PATENT DOCUMENTS

2018/0091293 A1\* 3/2018 Suresh .................... H04L 9/002
2018/0091300 A1\* 3/2018 Tomishima ........... G11C 11/161

OTHER PUBLICATIONS

Rick Shen et al., "Highly Reliable Anti-Fuse Technology in sub-16nm Technologies for Security Applications", 2016, International Conference on IC Design and Technology (ICICDT), IEEE, Jun. 27, 2016, pp. 1-4, eMemory Technology Inc.

\* cited by examiner

| | WL | FL | AF1 | AF2 | AF3 | AF4 | ISO | BLm0 | BLc0 | BLr0 | BLm1 | BLc1 | BLr1 |
|---|---|---|---|---|---|---|---|---|---|---|---|---|---|
| Enrolling action | Vdd1 | Vdd2 | Vpp | Vpp | Vdd2 | Vdd2 | Vdd2 | 0V | Vdd1 | Vdd1 | 0V | Vdd1 | Vdd1 |
| Copying action | Vdd1 | Vdd2 | Vdd2 | Vdd2 | Vpp | Vpp | 0V | 0V | Vdd1 | Vdd1 | 0V | 0V | Vdd1 |
| Reading action | Vdd1 | Vdd1 | Vdd2 | Vdd2 | Vdd2 | Vdd2 | 0V | 0V | 0V | 0V | 0V | 0V | 0V |

ANTIFUSE PHYSICALLY UNCLONABLE FUNCTION UNIT AND ASSOCIATED CONTROL METHOD

This application claims the benefit of U.S. provisional application Ser. No. 62/406,968, filed Oct. 12, 2016, the disclosure of which is incorporated by reference herein in its entirety.

FIELD OF THE INVENTION

The present invention relates to an antifuse cell and a control method, and more particularly to an antifuse PUF unit for a physically unclonable function (PUF) technology and an associated control method.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code. This random code is used as a unique identity code (ID code) of the semiconductor chip to achieve the protecting function.

Generally, the PUF technology acquires the random code of the semiconductor chip according to the manufacturing variation of the semiconductor chip. This manufacturing variation includes semiconductor process variation. That is, even if the PUF semiconductor chip is produced by a precise fabricating process, the random code cannot be duplicated. Consequently, the PUF semiconductor chip is suitably used in the applications with high security requirements.

Moreover, U.S. Pat. No. 9,613,714 disclosed a one time programming memory cell and a memory array for a PUF technology and an associated random code generating method.

SUMMARY OF THE INVENTION

The present invention provides an antifuse PUF unit and an associated control method. According to the according to the manufacturing variation of the semiconductor chip, the antifuse PUF unit stores a unique random code after an enrolling action and a copying action are completed. Moreover, the unique random code is obtained after a reading action is completed. Furthermore, the antifuse PUF unit is a kind of PUF circuit capable of providing the unique random code.

An embodiment of the present invention provides an antifuse PUF unit. The antifuse PUF unit includes a first sub-antifuse cell, a second sub-antifuse cell, a connection circuit, a first copying circuit and a first reading circuit. The first sub-antifuse cell includes a first select transistor, a first switching transistor and a first antifuse transistor. A gate terminal of the first select transistor is connected with a word line. A first source/drain terminal of the first select transistor is connected with a first cell bit line. A second source/drain terminal of the first select transistor is connected with a first node. A gate terminal of the first switching transistor is connected with a switch control line. A first source/drain terminal of the first switching transistor is connected with the first node. A gate terminal of the first antifuse transistor is connected with a first antifuse control line. A first source/drain terminal of the first antifuse transistor is connected with a second source/drain terminal of the first switching transistor. The second sub-antifuse cell includes a second select transistor, a second switching transistor and a second antifuse transistor. A gate terminal of the second select transistor is connected with the word line. A first source/drain terminal of the second select transistor is connected with a second cell bit line. A second source/drain terminal of the second select transistor is connected with a second node. A gate terminal of the second switching transistor is connected with the switch control line. A first source/drain terminal of the second switching transistor is connected with the second node. A gate terminal of the second antifuse transistor is connected with a second antifuse control line. A first source/drain terminal of the second antifuse transistor is connected with a second source/drain terminal of the second switching transistor. The connection circuit is connected with a second source/drain terminal of the first antifuse transistor and a second source/drain terminal of the second antifuse transistor. The first copying circuit is connected with the first sub-antifuse cell, and includes a third antifuse transistor. The first reading circuit is connected with the first copying circuit. The first reading circuit generates a random code according to a state of the third antifuse transistor.

Another embodiment of the present invention provides a control method for an antifuse PUF unit. The antifuse PUF unit includes a first sub-antifuse cell, a second sub-antifuse cell, a connection circuit, a first copying circuit and a first reading circuit. The first sub-antifuse cell includes a first antifuse transistor. The second sub-antifuse cell includes a second antifuse transistor. The connection circuit is connected between the first sub-antifuse cell and the second sub-antifuse cell. The first copying circuit is connected with the first sub-antifuse cell, and includes a third antifuse transistor. The first reading circuit is connected with the first copying circuit. The control method includes the following steps. Firstly, an enrolling action is performed. Consequently, the first antifuse transistor and second antifuse transistor have different states. Then, a copying action is performed. Consequently, the first antifuse transistor and the third antifuse transistor have the same state. Then, a reading action is performed to generate a random code according to the state of the third antifuse transistor.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

As is well known, a non-volatile memory is able to continuously retain data after the supplied power is interrupted. An antifuse cell is one kind of non-volatile memory. The antifuse cell can be programmed once. After the antifuse cell is programmed, the stored data cannot be modified.

The antifuse cell comprises an antifuse transistor. If the voltage difference between the gate terminal and the source/drain terminal of the antifuse transistor is not higher than the withstanding voltage, the antifuse transistor is in a high-resistance state. Whereas, if the voltage difference between the gate terminal and the source/drain terminal of the antifuse transistor is higher than the withstanding voltage, the gate oxide layer of the antifuse transistor is ruptured and the antifuse transistor is in a low-resistance state.

Figure 1:
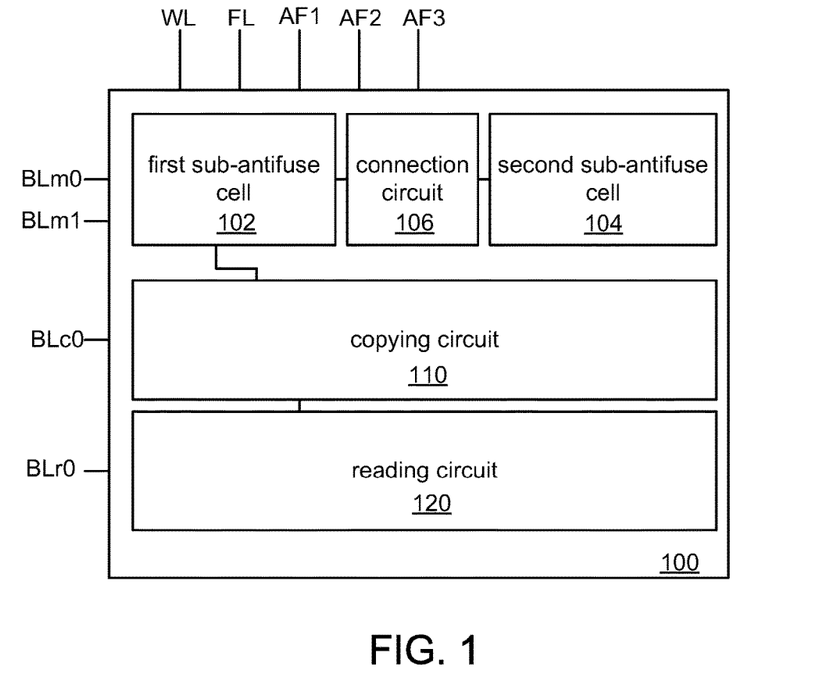
FIG. 1 is a schematic circuit block diagram of an antifuse PUF unit according to an embodiment of the present invention.

FIG. 1 is a schematic circuit block diagram of an antifuse PUF unit according to an embodiment of the present invention. As shown in FIG. 1, the antifuse PUF unit 100 comprises a first sub-antifuse cell 102, a second sub-antifuse cell 104, a connection circuit 106, a copying circuit 110 and a reading circuit 120. Moreover, plural control lines are connected with the antifuse PUF unit 100. These control lines include a word line WL, a switch control line FL, antifuse control lines AF1, AF2, AF3 and bit lines BLm0, BLc0, BLr0, BLm1. Some examples of the antifuse PUF unit will be illustrated as follows.

Figure 2A:
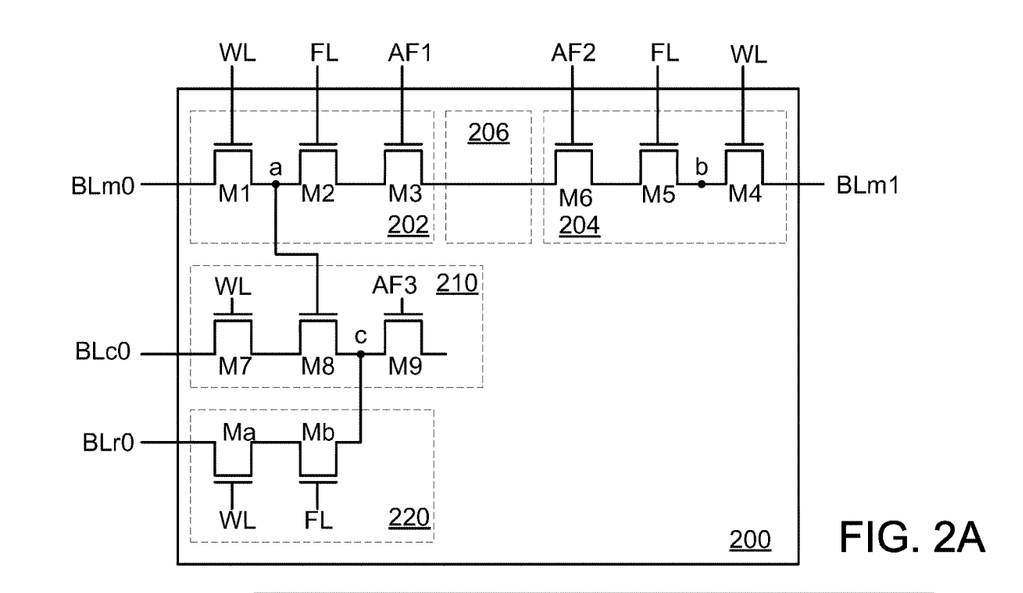
FIG. 2A is a schematic circuit diagram illustrating a first example of the antifuse PUF unit according to the embodiment of the present invention.

FIG. 2A is a schematic circuit diagram illustrating a first example of the antifuse PUF unit according to the embodiment of the present invention. As shown in FIG. 2A, the antifuse PUF unit 200 comprises a first sub-antifuse cell 202, a second sub-antifuse cell 204, a connection circuit 206, a copying circuit 210 and a reading circuit 220.

The first sub-antifuse cell 202 comprises a select transistor M1, a switching transistor M2 and an antifuse transistor M3. The gate terminal of the select transistor M1 is connected with the word line WL. The first source/drain terminal of the select transistor M1 is connected with the cell bit line BLm0. The second source/drain terminal of the select transistor M1 is connected with a node "a". The gate terminal of the switching transistor M2 is connected with the switch control line FL. The first source/drain terminal of the switching transistor M2 is connected with the node "a". The gate terminal of the antifuse transistor M3 is connected with the antifuse control line AF1. The first source/drain terminal of the antifuse transistor M3 is connected with the second source/drain terminal of the switching transistor M2.

The second sub-antifuse cell 204 comprises a select transistor M4, a switching transistor M5 and an antifuse transistor M6. The gate terminal of the select transistor M4 is connected with the word line WL. The first source/drain terminal of the select transistor M4 is connected with the cell bit line BLm1. The second source/drain terminal of the select transistor M4 is connected with a node "b". The gate terminal of the switching transistor M5 is connected with the switch control line FL. The first source/drain terminal of the switching transistor M5 is connected with the node "b". The gate terminal of the antifuse transistor M6 is connected with the antifuse control line AF2. The first source/drain terminal of the antifuse transistor M6 is connected with the second source/drain terminal of the switching transistor M5.

The connection circuit 206 comprises a conducting wire. The conducting wire is connected with the second source/drain terminal of the antifuse transistor M3 and the second source/drain terminal of the antifuse transistor M6.

The copying circuit 210 comprises a select transistor M7, a switching transistor M8 and an antifuse transistor M9. The gate terminal of the select transistor M7 is connected with the word line WL. The first source/drain terminal of the select transistor M7 is connected with the copy bit line BLc0. The gate terminal of the switching transistor M8 is connected with the node "a". The first source/drain terminal of the switching transistor M8 is connected with the second source/drain terminal of the select transistor M7. The second source/drain terminal of the switching transistor M8 is connected with a node "c". The gate terminal of the antifuse transistor M9 is connected with the antifuse control line AF3. The first source/drain terminal of the antifuse transistor M9 is connected with the node "c". The second source/drain terminal of the antifuse transistor M9 is in a floating state.

The reading circuit 220 comprises a select transistor Ma and a switching transistor Mb. The gate terminal of the select transistor Ma is connected with the word line WL. The first source/drain terminal of the select transistor Ma is connected with the read bit line BLr0. The gate terminal of the switching transistor Mb is connected with the switch control line FL. The first source/drain terminal of the switching transistor Mb is connected with the second source/drain terminal of the select transistor Ma. The second source/drain terminal of the switching transistor Mb is connected with the node "c".

Figure 2B:
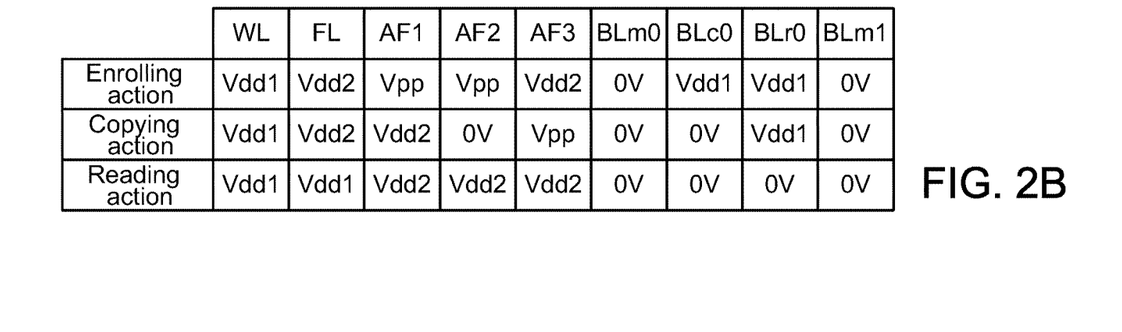
FIG. 2B is a bias voltage table illustrating the bias voltages for enrolling, copying or reading the antifuse PUF unit of FIG. 2A.

FIG. 2B is a bias voltage table illustrating the bias voltages for enrolling, copying or reading the antifuse PUF unit of FIG. 2A. When associated bias voltages are applied to the antifuse PUF unit 200, an enrolling action, a copying action or a reading action is performed. The voltage values in the bias voltage table are presented herein for purpose of illustration and description only and are not intended as a definition of the limits of the present invention.

While the enrolling action is performed, the state of one of the antifuse transistor M3 and the antifuse transistor M6 is changed. For example, the antifuse transistor M3 is changed to the low-resistance state, but the antifuse transistor M6 is maintained in the high-resistance state. Alternatively, the antifuse transistor M6 is changed to the low-resistance state, but the antifuse transistor M3 is maintained in the high-resistance state.

Due to the manufacturing variation of the sub-antifuse cells 202 and 204, it is unable to realize which of the antifuse transistors has the changed state while the enrolling action is performed. Consequently, the antifuse PUF unit can utilize the PUF technology.

While the copying action is performed, the state of the antifuse transistor M3 of the sub-antifuse cell 202 is copied to the antifuse transistor M9 by the copying circuit 210. For example, if the antifuse transistor M3 is in the low-resistance state, the antifuse transistor M9 of the copying circuit 210 is changed to the low-resistance state. Whereas, if the antifuse transistor M3 is in the high-resistance state, the antifuse transistor M9 of the copying circuit 210 is changed to the high-resistance state.

While the reading action is performed, the reading circuit output a read current according to the state of the antifuse transistor M9.

Figure 3A:
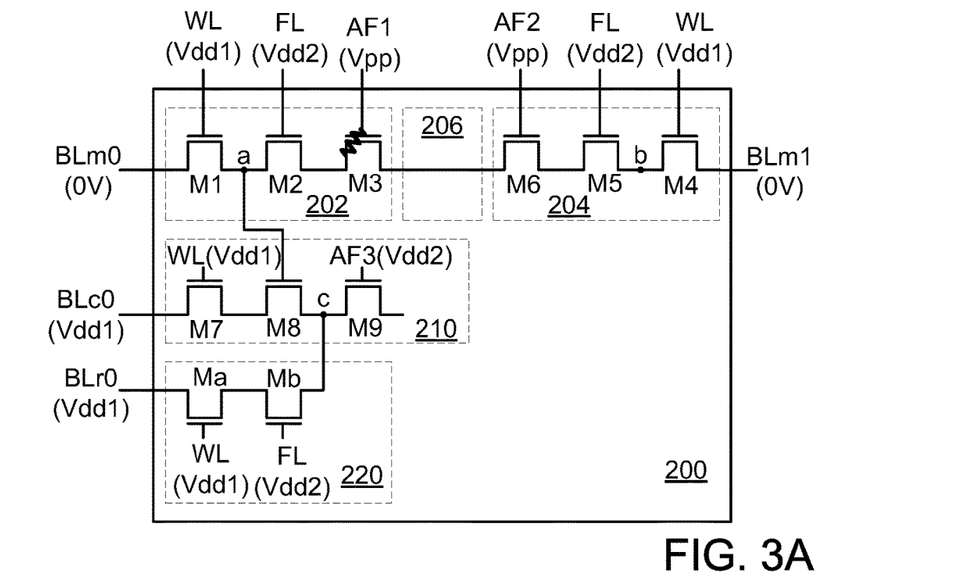
FIG. 3A schematically illustrates the operation of the antifuse PUF unit of FIG. 2A in a situation when the enrolling action is performed.

FIG. 3A schematically illustrates the operation of the antifuse PUF unit of FIG. 2A in a situation when the enrolling action is performed. In this embodiment, the power voltage Vdd1 is in the range between 1V and 2V, the power voltage Vdd2 is in the range between 2V and 4V, and the power voltage Vpp is in the range between 4V and 10V. In fact, the power voltage Vpp is higher than the power voltage Vdd2 and the power voltage Vdd2 is higher than the power voltage Vdd1.

While the enrolling action is performed, the select transistors M1, M4, M7 and Ma are turned on, and the switching transistors M2, M5 and Mb are turned on. Meanwhile, the voltage difference between the gate terminal and the first source/drain terminal of the antifuse transistor M3 is Vpp (Vpp−0V), and the voltage difference between the gate terminal and the first source/drain terminal of the antifuse transistor M6 is Vpp (Vpp−0V). Since Vpp is beyond the withstanding voltage range of the antifuse transistors M3 and M6, the gate oxide layer of one of the antifuse transistors M3 and M6 is ruptured. The state of the antifuse transistor with the ruptured gate oxide layer is changed to the low-resistance state.

Please refer to FIG. 3A again. The gate oxide layer of the antifuse transistor M3 of the first sub-antifuse cell 202 is ruptured, and thus the state of the antifuse transistor M3 is changed to the low-resistance state. Since the gate oxide layer of the antifuse transistor M6 of the second sub-antifuse cell 204 is not ruptured, the state of the antifuse transistor M6 is maintained in the high-resistance state. The voltage difference between the gate terminal and the first source/drain terminal of the antifuse transistor M9 of the copying circuit 210 is about (Vdd2−Vdd1). Consequently, the antifuse transistor M9 is maintained in the high-resistance state.

Figure 3B:
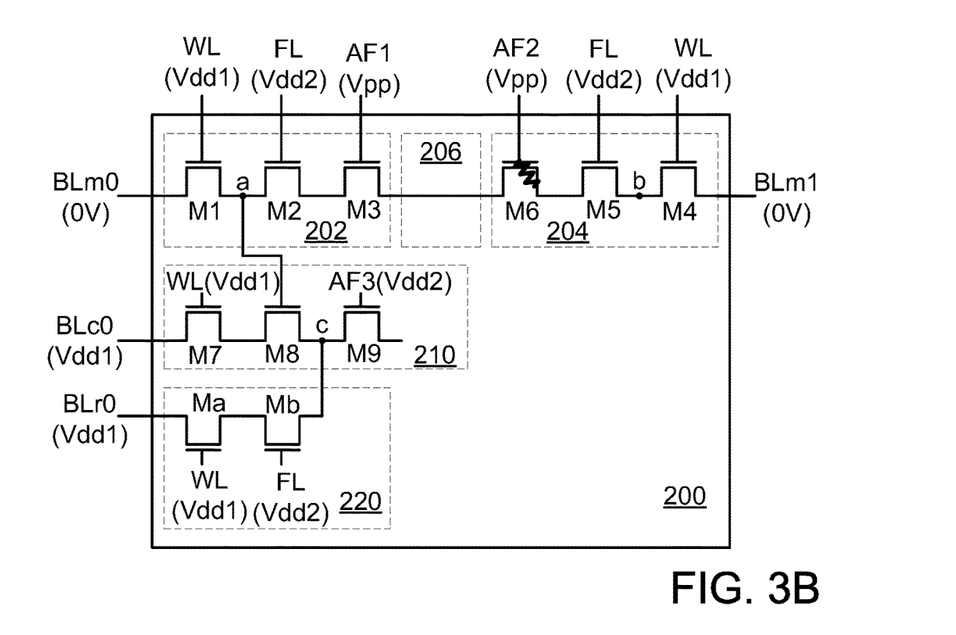
FIG. 3B schematically illustrates the operation of the antifuse PUF unit of FIG. 2A in another situation when the enrolling action is performed.

FIG. 3B schematically illustrates the operation of the antifuse PUF unit of FIG. 2A in another situation when the enrolling action is performed. The gate oxide layer of the antifuse transistor M6 of the second sub-antifuse cell 204 is ruptured, and thus the state of the antifuse transistor M6 is changed to the low-resistance state. Since the gate oxide layer of the antifuse transistor M3 of the first sub-antifuse cell 202 is not ruptured, the state of the antifuse transistor M3 is maintained in the high-resistance state.

Figure 3C:
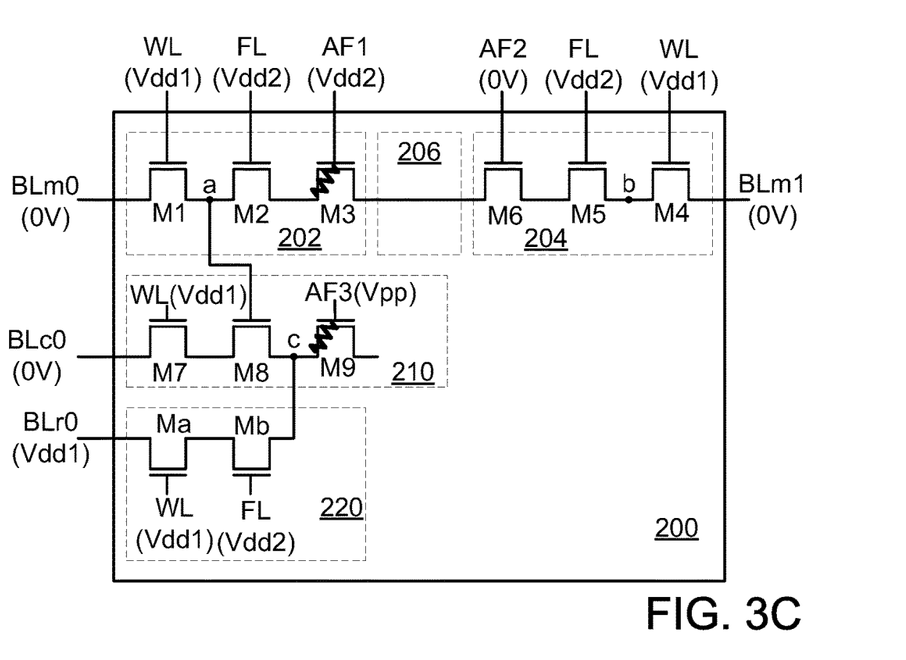
FIG. 3C schematically illustrates the operation of the antifuse PUF unit of FIG. 2A when the antifuse transistor M3 is in the low-resistance state and the copying action is performed.

FIG. 3C schematically illustrates the operation of the antifuse PUF unit of FIG. 2A when the antifuse transistor M3 is in the low-resistance state and the copying action is performed. As shown in FIG. 3C, the antifuse transistor M3 is in the low-resistance state, and the antifuse transistor M6 is in the high-resistance state.

While the copying action is performed, the voltage applied to the antifuse control line AF2 is 0V. Consequently, the two sub-antifuse cells 202 and 204 are isolated from each other. Moreover, the select transistors M1, M4, M7 and Ma are turned on, and the switching transistors M2, M5 and Mb are turned on.

Since the antifuse transistor M3 is in the low-resistance state, the voltage at the node "a" is at a voltage level slightly smaller than Vdd2. Consequently, the switching transistor M8 is turned on. Meanwhile, the voltage difference between the gate terminal and the first source/drain terminal of the antifuse transistor M9 of the copying circuit 210 is Vpp (Vpp−0V). Since Vpp is beyond the withstanding voltage range of the antifuse transistor M9, the gate oxide layer of one of the antifuse transistor M9 is ruptured. Consequently, the state of the antifuse transistor M9 is changed to the low-resistance state.

Figure 3D:
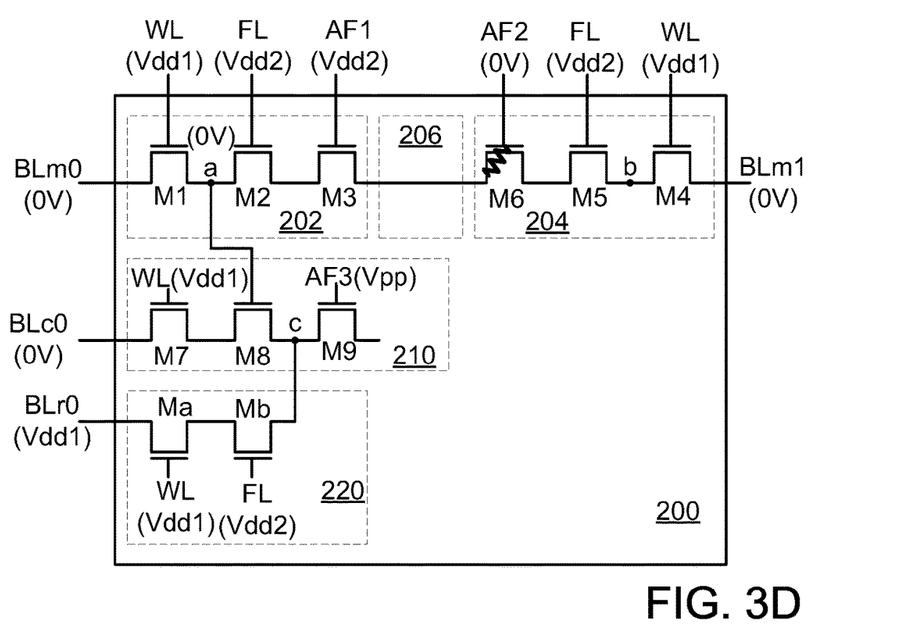
FIG. 3D schematically illustrates the operation of the antifuse PUF unit of FIG. 2A when the antifuse transistor M3 is in the high-resistance state and the copying action is performed.

FIG. 3D schematically illustrates the operation of the antifuse PUF unit of FIG. 2A when the antifuse transistor M3 is in the high-resistance state and the copying action is performed. As shown in FIG. 3D, the antifuse transistor M3 is in the high-resistance state, and the antifuse transistor M6 is in the low-resistance state.

While the copying action is performed, the voltage applied to the antifuse control line AF2 is 0V. Consequently, the two sub-antifuse cells 202 and 204 are isolated from each other. Moreover, the select transistors M1, M4, M7 and Ma are turned on, and the switching transistors M2, M5 and Mb are turned on.

Since the antifuse transistor M3 is in the high-resistance state, the voltage at the node "a" is about 0V. Consequently, the switching transistor M8 is turned off. Meanwhile, the voltage difference between the gate terminal and the first source/drain terminal of the antifuse transistor M9 of the copying circuit 210 is (Vpp−Vdd1). Since (Vpp−Vdd1) is within the withstanding voltage range of the antifuse transistor M9, the state of the antifuse transistor M9 is maintained in the high-resistance state.

As described in FIGS. 3C and 3D, the antifuse transistor M3 and the antifuse transistor M9 have the same state after the copying action is completed.

Figure 3E:
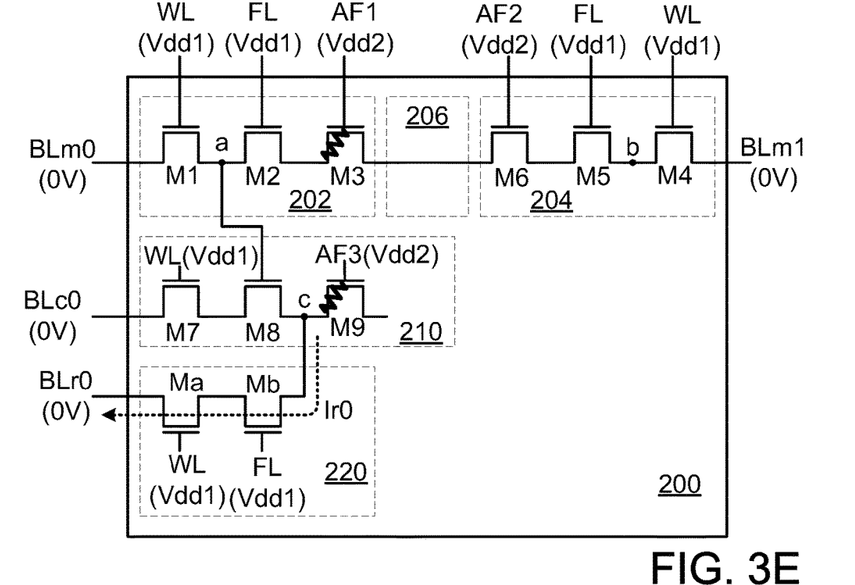
FIG. 3E schematically illustrates the operation of the antifuse PUF unit of FIG. 2A when the antifuse transistor M9 is in the low-resistance state and the reading action is performed.

FIG. 3E schematically illustrates the operation of the antifuse PUF unit of FIG. 2A when the antifuse transistor M9 is in the low-resistance state and the reading action is performed.

While the reading action is performed, the select transistors M1, M4, M7 and Ma are turned on, and the switching transistors M2, M5 and Mb are turned on. Since the antifuse transistor M9 is in the low-resistance state, the antifuse transistor M9 generates a larger read current Ir0. The read current Ir0 flows to the read bit line BLr0 through the node "c", the switching transistor Mb and the select transistor Ma sequentially. According to the magnitude of the read current Ir0 flowing through the read bit line BLr0, the antifuse PUF unit 200 is verified to be in the low-resistance state. Due to the low-resistance state, one bit of the random code is determined and applied to the PUF technology.

Figure 3F:
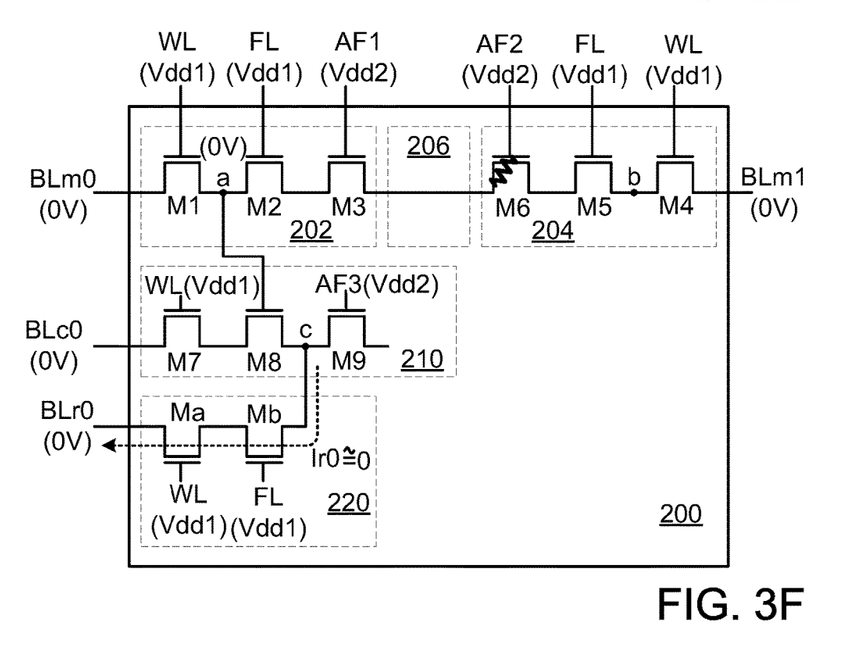
FIG. 3F schematically illustrates the operation of the antifuse PUF unit of FIG. 2A when the antifuse transistor M9 is in the high-resistance state and the reading action is performed.

FIG. 3F schematically illustrates the operation of the antifuse PUF unit of FIG. 2A when the antifuse transistor M9 is in the high-resistance state and the reading action is performed.

While the reading action is performed, the select transistors M1, M4, M7 and Ma are turned on, and the switching transistors M2, M5 and Mb are turned on. Since the antifuse transistor M9 is in the high-resistance state, the read current Ir0 generated by antifuse transistor M9 is nearly zero. According to the magnitude of the read current Ir0 flowing through the read bit line BLr0, the antifuse PUF unit 200 is verified to be in the high-resistance state. Due to the high-resistance state, one bit of the random code is determined and applied to the PUF technology.

As mentioned above, the read current Ir0 generates to the read bit line BLr0. Similarly, the corresponding read current generate to the cell bit line BLm0 and the copy bit line BLc0. In some embodiments, the state of the antifuse PUF unit 200 is judged according to the total of the read currents flowing through the three bit lines BLm0, BLc0 and BLr0.

Figure 4A:
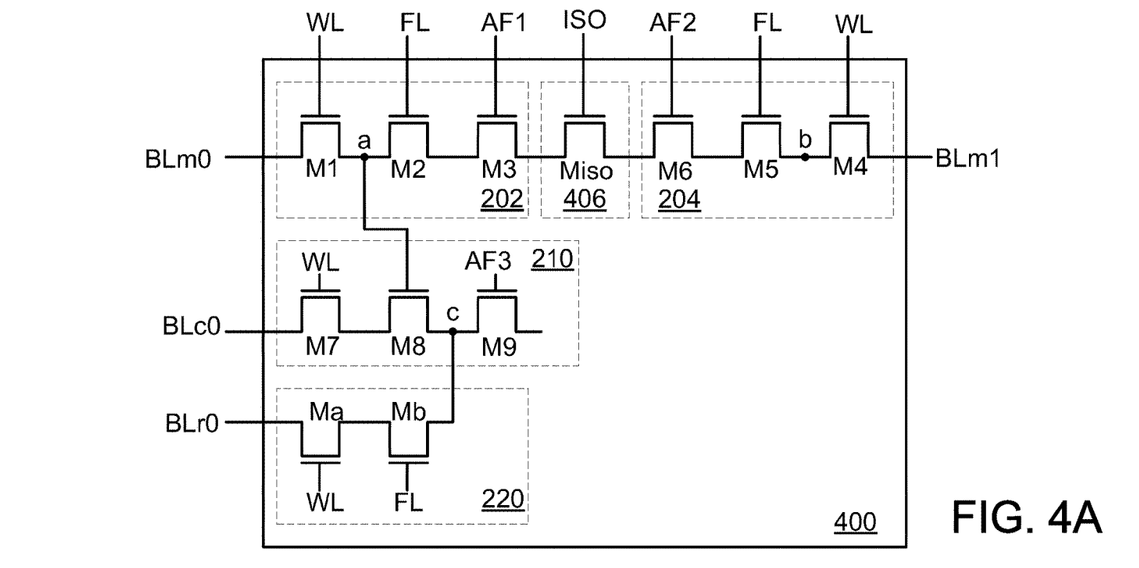
FIG. 4A is a schematic circuit diagram illustrating a second example of the antifuse PUF unit according to the embodiment of the present invention.

FIG. 4A is a schematic circuit diagram illustrating a second example of the antifuse PUF unit according to the embodiment of the present invention. In comparison with the first example, the connection circuit 406 of this embodiment is distinguished. In this embodiment, the connection circuit 406 of the antifuse PUF unit 400 comprises an isolation transistor Miso. The gate terminal of the isolation transistor Miso is connected with an isolation control line ISO. The first source/drain terminal of the isolation transistor Miso is connected with the second source/drain terminal of the antifuse transistor M3. The second source/drain terminal of the isolation transistor Miso is connected with the second source/drain terminal of the antifuse transistor M6.

Figure 4B:
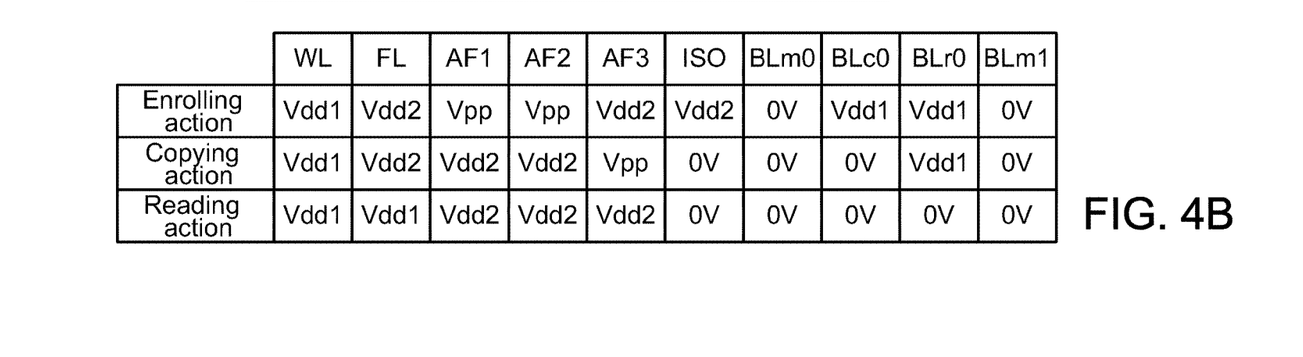
FIG. 4B is a bias voltage table illustrating the bias voltages for enrolling, copying or reading the antifuse PUF unit of FIG. 4A.

FIG. 4B is a bias voltage table illustrating the bias voltages for enrolling, copying or reading the antifuse PUF unit of FIG. 4A. When associated bias voltages are applied to the antifuse PUF unit, an enrolling action, a copying action or a reading action is performed. The voltage values in the bias voltage table are presented herein for purpose of illustration and description only and are not intended as a definition of the limits of the present invention.

While the enrolling action is performed, the power voltage Vdd2 is applied to the isolation control line ISO of the connection circuit 406. Since the isolation transistor Miso is turned on, the two sub-antifuse cells 202 and 204 are connected with each other. While the reading action is performed, the voltage 0V is applied to the isolation control line ISO of the connection circuit 406. Since the isolation transistor Miso is turned off, the two sub-antifuse cells 202 and 204 are isolated from each other.

Please refer to FIG. 4B. While the enrolling action is performed, the isolation transistor Miso is turned on. Consequently, the second source/drain terminal of the antifuse transistor M3 is electrically connected with the second source/drain terminal of the antifuse transistor M6. The bias voltages applied to the other control lines are similar to those of the first embodiment, and are not redundantly described herein. In other words, the state of one of the antifuse transistor M3 and the antifuse transistor M6 is changed. The operations of the antifuse PUF unit of this embodiment are similar to those of the first embodiment.

While the copying action is performed, the isolation transistor Miso is turned off. Consequently, the two sub-antifuse cells 202 and 204 are isolated from each other. After the copying action is completed, the antifuse transistor M3 and the antifuse transistor M9 have the same state. The operations of the antifuse PUF unit of this embodiment are similar to those of the first embodiment.

While the reading action is performed, the read current Ir0 flows to the read bit line BLr0. According to the magnitude of the read current Ir0 flowing through the read bit line BLr0, the state of the antifuse PUF unit 400 is realized. According to the state, one bit of the random code is determined and applied to the PUF technology.

Figures 5A, 5B:
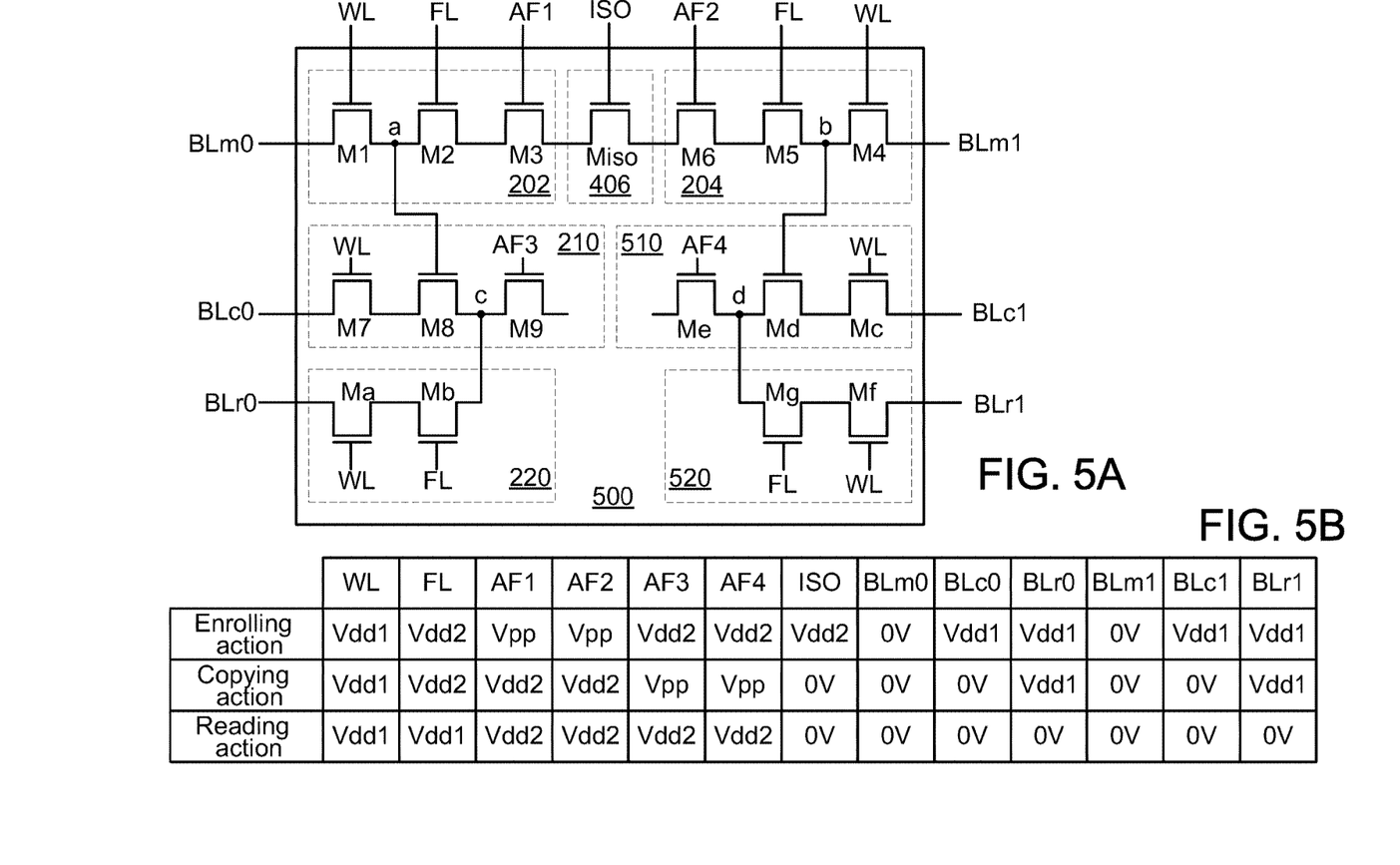
FIG. 5A is a schematic circuit diagram illustrating a third example of the antifuse PUF unit according to the embodiment of the present invention.
FIG. 5B is a bias voltage table illustrating the bias voltages for enrolling, copying or reading the antifuse PUF unit of FIG. 5A.

FIG. 5A is a schematic circuit diagram illustrating a third example of the antifuse PUF unit according to the embodiment of the present invention. The antifuse PUF unit 500 of this embodiment is a differential antifuse PUF unit. In comparison with the second example, the antifuse PUF unit 500 further comprises an additional copying circuit 510 and an additional reading circuit 520. The first sub-antifuse cell 202, the second sub-antifuse cell 204, the connection circuit 406, the copying circuit 210 and the reading circuit 220 are similar to those of the second embodiment, and are not redundantly described herein. The copying circuit 510 and the reading circuit 520 will be described as follows.

The copying circuit 510 comprises a select transistor Mc, a switching transistor Md and an antifuse transistor Me. The gate terminal of the select transistor Mc is connected with the word line WL. The first source/drain terminal of the select transistor Mc is connected with the copy bit line BLc1. The gate terminal of the switching transistor Md is connected with the node "b". The first source/drain terminal of the switching transistor Md is connected with the second source/drain terminal of the select transistor Mc. The second source/drain terminal of the switching transistor Md is connected with a node "d". The gate terminal of the antifuse transistor Me is connected with the antifuse control line AF4. The first source/drain terminal of the antifuse transistor Me is connected with the node "d". The second source/drain terminal of the antifuse transistor Me is in a floating state.

The reading circuit 520 comprises a select transistor Mc and a switching transistor Mg. The gate terminal of the select transistor Mf is connected with the word line WL. The first source/drain terminal of the select transistor Mf is connected with the read bit line BLr1. The gate terminal of the switching transistor Mg is connected with the switch control line FL. The first source/drain terminal of the switching transistor Mg is connected with the second source/drain terminal of the select transistor Mf. The second source/drain terminal of the switching transistor Mg is connected with the node "d".

FIG. 5B is a bias voltage table illustrating the bias voltages for enrolling, copying or reading the antifuse PUF unit of FIG. 5A.

When associated bias voltages are applied to the antifuse PUF unit, an enrolling action, a copying action or a reading action is performed. The voltage values in the bias voltage table are presented herein for purpose of illustration and description only and are not intended as a definition of the limits of the present invention.

Figure 6A:
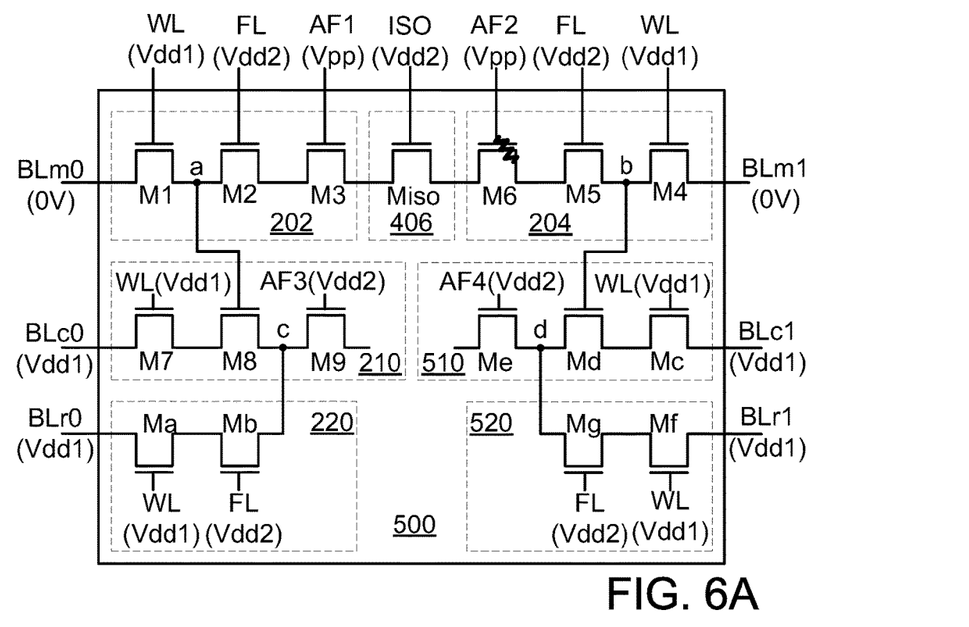
FIG. 6A schematically illustrates the operation of the antifuse PUF unit of FIG. 5A when the enrolling action is performed.

FIG. 6A schematically illustrates the operation of the antifuse PUF unit of FIG. 5A when the enrolling action is performed. In this embodiment, the power voltage Vdd1 is in the range between 1V and 2V, the power voltage Vdd2 is in the range between 2V and 4V, and the power voltage Vpp is in the range between 4V and 10V. In fact, the power voltage Vpp is higher than the power voltage Vdd2 and the power voltage Vdd2 is higher than the power voltage Vdd1.

While the enrolling action is performed, the select transistors M1, M4, M7, Ma, Mc and Mf are turned on, and the switching transistors M2, M5, Mb and Mg are turned on. Meanwhile, the voltage difference between the gate terminal and the first source/drain terminal of the antifuse transistor M3 is Vpp (Vpp−0V), and the voltage difference between the gate terminal and the first source/drain terminal of the antifuse transistor M6 is Vpp (Vpp−0V). Since Vpp is beyond the withstanding voltage range of the antifuse transistors M3 and M6, the gate oxide layer of one of the antifuse transistors M3 and M6 is ruptured. The state of the antifuse transistor with the ruptured gate oxide layer is changed to the low-resistance state.

Please refer to FIG. 6A again. The gate oxide layer of the antifuse transistor M6 of the second sub-antifuse cell 204 is ruptured, and thus the state of the antifuse transistor M6 is changed to the low-resistance state. Since the gate oxide layer of the antifuse transistor M3 of the first sub-antifuse cell 202 is not ruptured, the state of the antifuse transistor M3 is maintained in the high-resistance state. The voltage difference between the gate terminal and the first source/drain terminal of the antifuse transistor M9 of the copying circuit 210 is about (Vdd2−Vdd1). Similarly, the voltage difference between the gate terminal and the first source/drain terminal of the antifuse transistor Me of the copying circuit 510 is about (Vdd2−Vdd1). Consequently, the antifuse transistors M9 and Me are maintained in the high-resistance state.

Figure 6B:
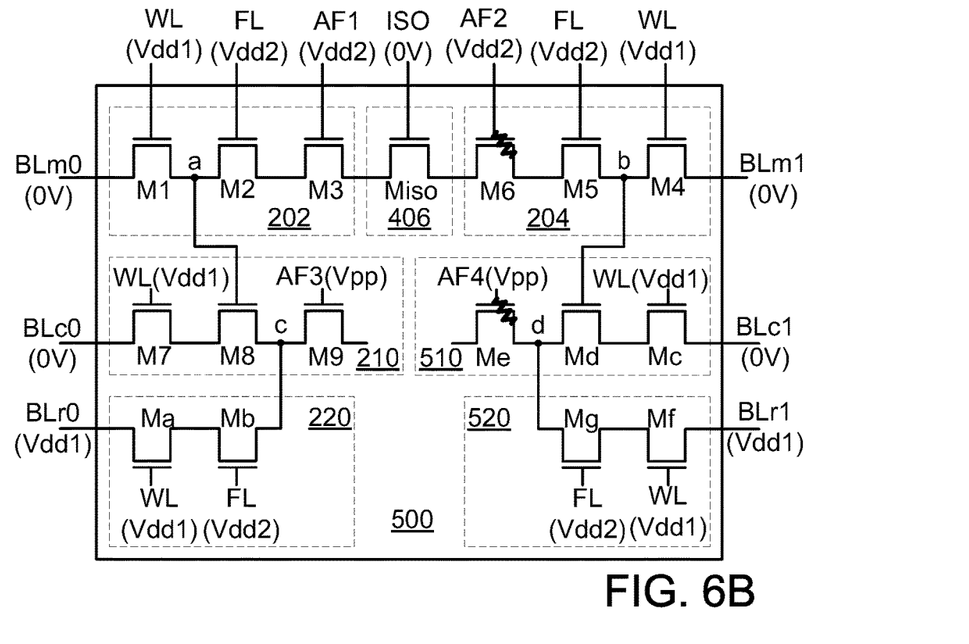
FIG. 6B schematically illustrates the operation of the antifuse PUF unit of FIG. 5A when the copying action is performed.

FIG. 6B schematically illustrates the operation of the antifuse PUF unit of FIG. 5A when the copying action is performed.

While the copying action is performed, the select transistors M1, M4, M7, Ma, Mc and Mf are turned on, and the switching transistors M2, M5, Mb and Mg are turned on.

Since the antifuse transistor M6 is in the low-resistance state, the voltage at the node "b" is at a voltage level slightly smaller than Vdd2. Consequently, the switching transistor Md is turned on. Since the antifuse transistor M3 is in the high-resistance state, the voltage at the node "a" is about 0V. Consequently, the switching transistor M8 is turned off.

Meanwhile, the voltage difference between the gate terminal and the first source/drain terminal of the antifuse transistor Me of the copying circuit 510 is Vpp (Vpp−0V). Since Vpp is beyond the withstanding voltage range of the antifuse transistor Me, the gate oxide layer of one of the antifuse transistor Me is ruptured. Consequently, the state of the antifuse transistor Me is changed to the low-resistance state. Moreover, the voltage difference between the gate terminal and the first source/drain terminal of the antifuse transistor M9 of the copying circuit 210 is (Vdd2−Vdd1). Consequently, the state of the antifuse transistor M9 is maintained in the high-resistance state.

As described in FIG. 6B, the antifuse transistor M3 and the antifuse transistor M9 are in the high-resistance state after the copying action is completed. Whereas, the antifuse transistor M6 and the antifuse transistor Me are in the low-resistance state after the copying action is completed.

Figure 6C:
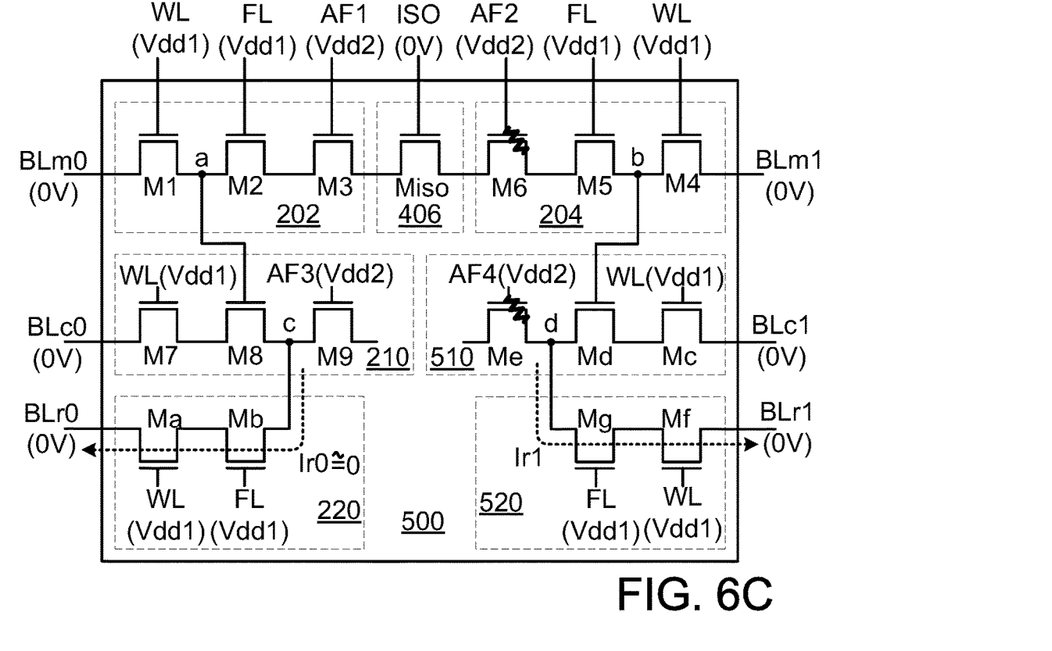
FIG. 6C schematically illustrates the operation of the antifuse PUF unit of FIG. 5A when the reading action is performed.

FIG. 6C schematically illustrates the operation of the antifuse PUF unit of FIG. 5A when the reading action is performed.

While the reading action is performed, the select transistors M1, M4, M7, Ma, Mc and Mf are turned on, and the switching transistors M2, M5, Mb and Mg are turned on. Since the antifuse transistor Me is in the low-resistance state, the antifuse transistor Me generates a larger read current Ir1. The read current Ir1 flows to the read bit line BLr1 through the node "d", the switching transistor Mg and the select transistor Mc sequentially.

Furthermore, since the antifuse transistor M9 is in the high-resistance state, the read current Ir0 generated by antifuse transistor M9 is nearly zero. According to the magnitude of the read current Ir0 flowing through the read bit line BLr0 and the magnitude of the read current Ir1 flowing through the read bit line BLr1, the state of the antifuse PUF unit 500 is realized. According to the state, one bit of the random code is determined and applied to the PUF technology.

In case that the read current Ir0 is lower than the read current Ir1, the antifuse PUF unit 500 is verified to have a first storage state. Whereas, in case that the read current Ir0 is higher than the read current Ir1, the antifuse PUF unit 500 is verified to have a second storage state. For example, the first storage state is a high-resistance state. The second storage state is a low-resistance state.

From the above descriptions, the present invention provides an antifuse PUF unit. Due to the manufacturing variation of the sub-antifuse cells 202 and 204, it is unable to realize which of the antifuse transistors has the changed state while the enrolling action is performed. Consequently, the antifuse PUF unit can utilize the PUF technology. While the copying action is performed, the state of the sub-antifuse cell 202 is copied by the copying circuit 210. Consequently, the reading circuit 220 generates the read current according to the state of the copying circuit 210 and a random code is determined according to the read current.

Figure 7:
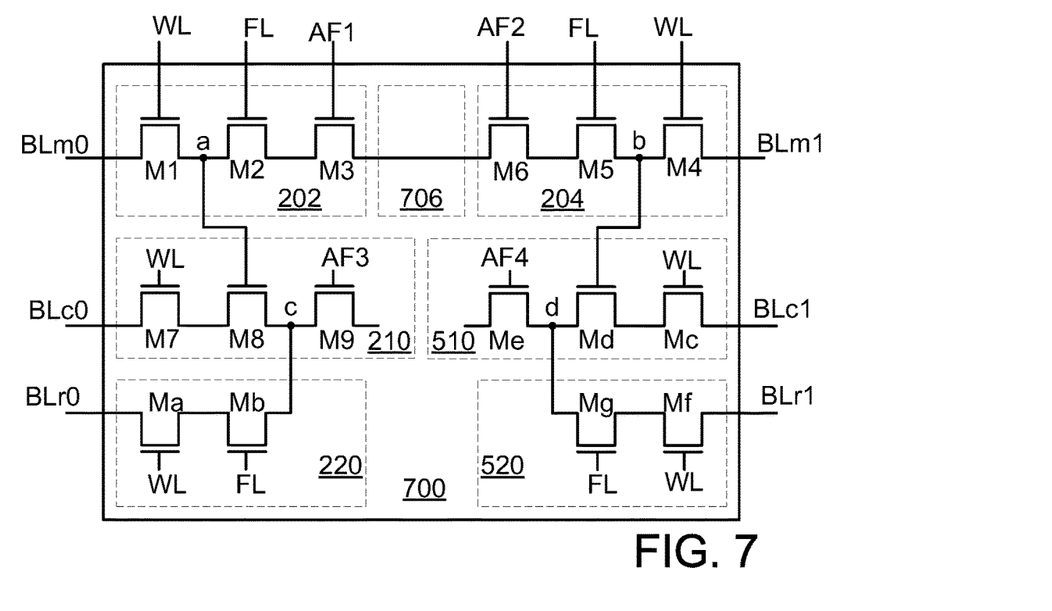
FIG. 7 is a schematic circuit diagram illustrating a fourth example of the antifuse PUF unit according to the embodiment of the present invention.

It is noted that numerous modifications and alterations may be made while retaining the teachings of the invention. FIG. 7 is a schematic circuit diagram illustrating a fourth example of the antifuse PUF unit according to the embodiment of the present invention. In comparison with the third embodiment, the connection circuit 706 is distinguished. In this embodiment, the connection circuit 706 of the antifuse PUF unit 700 comprises a conducting wire. The conducting wire is connected with the second source/drain terminal of the antifuse transistor M3 and the second source/drain terminal of the antifuse transistor M6.

When associated bias voltages are applied to the control lines of the antifuse PUF unit, an enrolling action, a copying action or a reading action is performed. The voltage values in the bias voltage table of the first, second or third embodiment may be used in the fourth embodiment.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An antifuse physically unclonable function (PUF) unit, comprising:

a first sub-antifuse cell comprising a first select transistor, a first switching transistor and a first antifuse transistor, wherein a gate terminal of the first select transistor is connected with a word line, a first source/drain terminal of the first select transistor is connected with a first cell bit line, a second source/drain terminal of the first select transistor is connected with a first node, a gate terminal of the first switching transistor is connected with a switch control line, a first source/drain terminal of the first switching transistor is connected with the first node, a gate terminal of the first antifuse transistor is connected with a first antifuse control line, and a first source/drain terminal of the first antifuse transistor is connected with a second source/drain terminal of the first switching transistor;
a second sub-antifuse cell comprising a second select transistor, a second switching transistor and a second antifuse transistor, wherein a gate terminal of the second select transistor is connected with the word line, a first source/drain terminal of the second select transistor is connected with a second cell bit line, a second source/drain terminal of the second select transistor is connected with a second node, a gate terminal of the second switching transistor is connected with the switch control line, a first source/drain terminal of the second switching transistor is connected with the second node, a gate terminal of the second antifuse transistor is connected with a second antifuse control line, and a first source/drain terminal of the second antifuse transistor is connected with a second source/drain terminal of the second switching transistor;
a connection circuit connected with a second source/drain terminal of the first antifuse transistor and a second source/drain terminal of the second antifuse transistor,
a first copying circuit connected with the first sub-antifuse cell, and comprising a third antifuse transistor; and
a first reading circuit connected with the first copying circuit, wherein the first reading circuit generates a random code according to a state of the third antifuse transistor.

2. The antifuse PUF unit as claimed in claim 1, wherein the connection circuit comprises a conducting wire, and the conducting wire is connected with the second source/drain terminal of the first antifuse transistor and the second source/drain terminal of the second antifuse transistor.

3. The antifuse PUF unit as claimed in claim 2, wherein the first copying circuit comprises a third select transistor, a third switching transistor and a third antifuse transistor, wherein a gate terminal of the third select transistor is connected with the word line, a first source/drain terminal of the third select transistor is connected with a first copy bit line, a second source/drain terminal of the third select transistor is connected with a first source/drain terminal of the third switching transistor, a gate terminal of the third switching transistor is connected with the first node, a second source/drain terminal of the third switching transistor is connected with a third node, a gate terminal of the third antifuse transistor is connected with a third antifuse control line, and a first source/drain terminal of the third antifuse transistor is connected with the third node.

4. The antifuse PUF unit as claimed in claim 3, wherein the first reading circuit comprises a fourth select transistor and a fourth switching transistor, wherein a gate terminal of the fourth select transistor is connected with the word line, a first source/drain terminal of the fourth select transistor is connected with a first read bit line, a second source/drain terminal of the fourth select transistor is connected with a first source/drain terminal of the fourth switching transistor, a gate terminal of the fourth switching transistor is connected with the switch control line, and a second source/drain terminal of the fourth switching transistor is connected with the third node.

5. The antifuse PUF unit as claimed in claim 4, further comprising:
second copying circuit comprises a fifth select transistor, a fifth switching transistor and a fourth antifuse transistor, wherein a gate terminal of the fifth select transistor is connected with the word line, a first source/drain terminal of the fifth select transistor is connected with a second copy bit line, a second source/drain terminal of the fifth select transistor is connected with a first source/drain terminal of the fifth switching transistor, a gate terminal of the fifth switching transistor is connected with the second node, a second source/drain terminal of the fifth switching transistor is connected with a fourth node, a gate terminal of the fourth antifuse transistor is connected with a fourth antifuse control line, and a first source/drain terminal of the fourth antifuse transistor is connected with the fourth node; and
a second reading circuit comprising a sixth select transistor and a sixth switching transistor, wherein a gate terminal of the sixth select transistor is connected with the word line, a first source/drain terminal of the sixth select transistor is connected with a second read bit line, a second source/drain terminal of the sixth select transistor is connected with a first source/drain terminal of the sixth switching transistor, a gate terminal of the sixth switching transistor is connected with the switch control line, and a second source/drain terminal of the sixth switching transistor is connected with the fourth node.

6. The antifuse PUF unit as claimed in claim 1, wherein the connection circuit comprises an isolation transistor, wherein a gate terminal of the isolation transistor is connected with an isolation control line, a first source/drain terminal of the isolation transistor is connected with the second source/drain terminal of the first antifuse transistor, and a second source/drain terminal of the isolation transistor is connected with the second source/drain terminal of the second antifuse transistor.

7. The antifuse PUF unit as claimed in claim 6, wherein the first copying circuit comprises a third select transistor, a third switching transistor and a third antifuse transistor, wherein a gate terminal of the third select transistor is connected with the word line, a first source/drain terminal of the third select transistor is connected with a first copy bit line, a second source/drain terminal of the third select transistor is connected with a first source/drain terminal of the third switching transistor, a gate terminal of the third switching transistor is connected with the first node, a second source/drain terminal of the third switching transistor is connected with a third node, a gate terminal of the third antifuse transistor is connected with a third antifuse control line, and a first source/drain terminal of the third antifuse transistor is connected with the third node.

8. The antifuse PUF unit as claimed in claim 7, wherein the first reading circuit comprises a fourth select transistor and a fourth switching transistor, wherein a gate terminal of the fourth select transistor is connected with the word line, a first source/drain terminal of the fourth select transistor is connected with a first read bit line, a second source/drain terminal of the fourth select transistor is connected with a first source/drain terminal of the fourth switching transistor, a gate terminal of the fourth switching transistor is connected with the switch control line, and a second source/drain terminal of the fourth switching transistor is connected with the third node.

9. The antifuse PUF unit as claimed in claim 8, further comprising:

second copying circuit comprises a fifth select transistor, a fifth switching transistor and a fourth antifuse transistor, wherein a gate terminal of the fifth select transistor is connected with the word line, a first source/drain terminal of the fifth select transistor is connected with a second copy bit line, a second source/drain terminal of the fifth select transistor is connected with a first source/drain terminal of the fifth switching transistor, a gate terminal of the fifth switching transistor is connected with the second node, a second source/drain terminal of the fifth switching transistor is connected with a fourth node, a gate terminal of the fourth antifuse transistor is connected with a fourth antifuse control line, and a first source/drain terminal of the fourth antifuse transistor is connected with the fourth node; and a second reading circuit comprising a sixth select transistor and a sixth switching transistor, wherein a gate terminal of the sixth select transistor is connected with the word line, a first source/drain terminal of the sixth select transistor is connected with a second read bit line, a second source/drain terminal of the sixth select transistor is connected with a first source/drain terminal of the sixth switching transistor, a gate terminal of the sixth switching transistor is connected with the switch control line, and a second source/drain terminal of the sixth switching transistor is connected with the fourth node.

10. A control method for an antifuse physically unclonable function (PUF) unit, the antifuse PUF unit comprising a first sub-antifuse cell, a second sub-antifuse cell, a connection circuit, a first copying circuit and a first reading circuit, the first sub-antifuse cell comprising a first antifuse transistor, the second sub-antifuse cell comprising a second antifuse transistor, the connection circuit being connected between the first sub-antifuse cell and the second sub-antifuse cell, the first copying circuit being connected with the first sub-antifuse cell, and comprising a third antifuse transistor, the first reading circuit being connected with the first copying circuit, the control method comprising steps of:

performing an enrolling action, so that the first antifuse transistor and second antifuse transistor have different states;

performing a copying action, so that the first antifuse transistor and the third antifuse transistor have the same state; and performing a reading action to generate a random code according to the state of the third antifuse transistor.

11. The control method as claimed in claim 10, further comprising a step of realizing the state of the third antifuse transistor according to a first read current.

12. The control method as claimed in claim 10, wherein the antifuse PUF unit further comprises a second copying circuit and a second reading circuit, wherein the second copying circuit comprises a fourth antifuse transistor, and the second reading circuit is connected with the second copying circuit, wherein while the copying action is performed, the second antifuse transistor and the fourth antifuse transistor have the same state.

13. The control method as claimed in claim 12, wherein while the reading action is performed, a second read current is further generated according to the state of the fourth antifuse transistor.

14. The control method as claimed in claim 13, wherein the random code is generated further according to a first read current retrieved from the third antifuse transistor and the second read current.

* * * * *